United States Patent [19]

Roze et al.

[11] 3,756,063
[45] Sept. 4, 1973

[54] SHRINK FORMING APPARATUS WITH AXIAL RUN-OUT TOOLING

[75] Inventors: Albert Roze, Chicago; Vernon R. Fencl, Northbrook; Hans R. Luedi, Highland Park, all of Ill.

[73] Assignee: Grotnes Machine Works, Inc., Chicago, Ill.

[22] Filed: Apr. 27, 1972

[21] Appl. No.: 248,116

[52] U.S. Cl. .............................. 72/356, 29/159.3
[51] Int. Cl. .......................................... B21d 53/30
[58] Field of Search ..................... 29/159.1, 159.3; 408/130; 72/354, 359, 356

[56] References Cited
UNITED STATES PATENTS

| | | | |
|---|---|---|---|
| 3,580,043 | 5/1971 | Golliwitzer | 29/159.3 |
| 3,581,550 | 6/1971 | Waterbury | 29/159.3 |
| 2,884,819 | 5/1959 | Roubloff | 408/130 |
| 3,461,710 | 8/1969 | Luedi et al | 72/372 |
| 3,564,898 | 2/1971 | Stettler | 29/159.1 |

Primary Examiner—Richard J. Herbst
Attorney—C. Frederick Leydig et al.

[57] ABSTRACT

An apparatus for radial compression forming and axial direction forming of metal articles, of the type such as steel automobile wheels, with auxiliary machining operations being performed in the same work station. The wheel formed from several pressed component pieces including an outer flange and central spider is fitted into the open annularly disposed jaws of a shrink forming head whereupon the compression forming operation is performed by contraction of the jaws in the radial direction. The apparatus includes a concentrically disposed axially driven piston carrying tool means for deforming the web portion of the wheel to correct axial run-out or establish perpendicularity of the web with respect to the flange portion. The axially driven piston and tool means is fluid powered so as to enable sensing contact with the web portion by the tool means and thereafter imparting a predetermined amount of axial movement to deform the wheel web by a corresponding predetermined amount.

5 Claims, 3 Drawing Figures

SHRINK FORMING APPARATUS WITH AXIAL RUN-OUT TOOLING

DESCRIPTION OF THE INVENTION

The present invention relates generally to apparatus for shrinking or radial compression forming of metal articles, and more particularly to improved shrink forming apparatus which is capable of radial compression forming and axial direction forming, yet provides open access to the article from opposite ends for operations with auxiliary tooling in the same work station.

There is disclosed and claimed in Hans R. Luedi et al. U.S. Pat. No. 3,461,710 methods and apparatus for shrink forming metal articles wherein provision is made for placing annular workpieces into the apparatus at one end and the other end of the apparatus receives workpiece forming tools to perform auxiliary operations in the same work station. This type of apparatus has been found to be particularly useful in the manufacture of metal articles such as automobile wheels which are commonly fabricated by welding together several pressed component pieces with the final sizing and machining operations such as reaming the mounting holes in the wheels being carried out within the shrink forming head itself.

Apparatus for use with the aforementioned compression forming equipment which is yet more particularly adapted to be utilized in the manufacture of articles such as the automobile wheels in an automated manner is disclosed and claimed in Christian H. Stettler U.S. Pat. No. 3,564,898. Utilization of either of the shrink forming apparatus of the aforementioned patents for automobile wheel manufacturing bring the wheel within allowable tolerances of diameter and roundness in the radial direction. However, a further difficulty that has been encountered in manufacturing articles such as automobiles wheels is that the central hub or spider, adapted to be secured to the vehicle wheel mounting such as the brake drum, is not always within required tolerances of perpendicularity with respect to the outer peripheral flange that receives the tire. The permissible tolerances for such lack of perpendicularity or axial "run-out" are relatively small and a substantial number of rejected wheels have heretofore resulted.

Accordingly, it is a general aim of the present invention to provide apparatus for radial compression forming of metal articles which is extremely versatile and is also capable of axial direction forming operations on such metal articles. In this connection it is an object to provide a straight through shrink forming apparatus of the aforementioned type which permits introduction of a product received from one end while auxiliary tooling may be fed in from the opposite end.

Another object is to provide an apparatus of the above description wherein the axial forming means operation includes a wiping action with respect to the article which smooths out the contacted surface portion of the article while forming the same.

One of the more specific objects of the invention is to provide an improved shrinking apparatus having means for axially deforming predetermined portions of the article wherein said deforming means includes provision for sensing contact with the article and thereafter deforming the contacted portion by a preselected fixed amount in the axial direction.

Other objects and advantages of the invention will become apparent from reading the following detailed description and from reference to the drawings, in which.

While the invention is susceptible of various modifications and alternative forms, a specific embodiment thereof has been shown by way of example and will herein be described in detail. It should be understood, however, that it is not intended to limit the invention to the particular form disclosed, but, on the contrary, the intention is to cover all modifications, equivalents and alternatives that fall within the spirit and scope of the invention as expressed in the appended claims.

Figure 1:
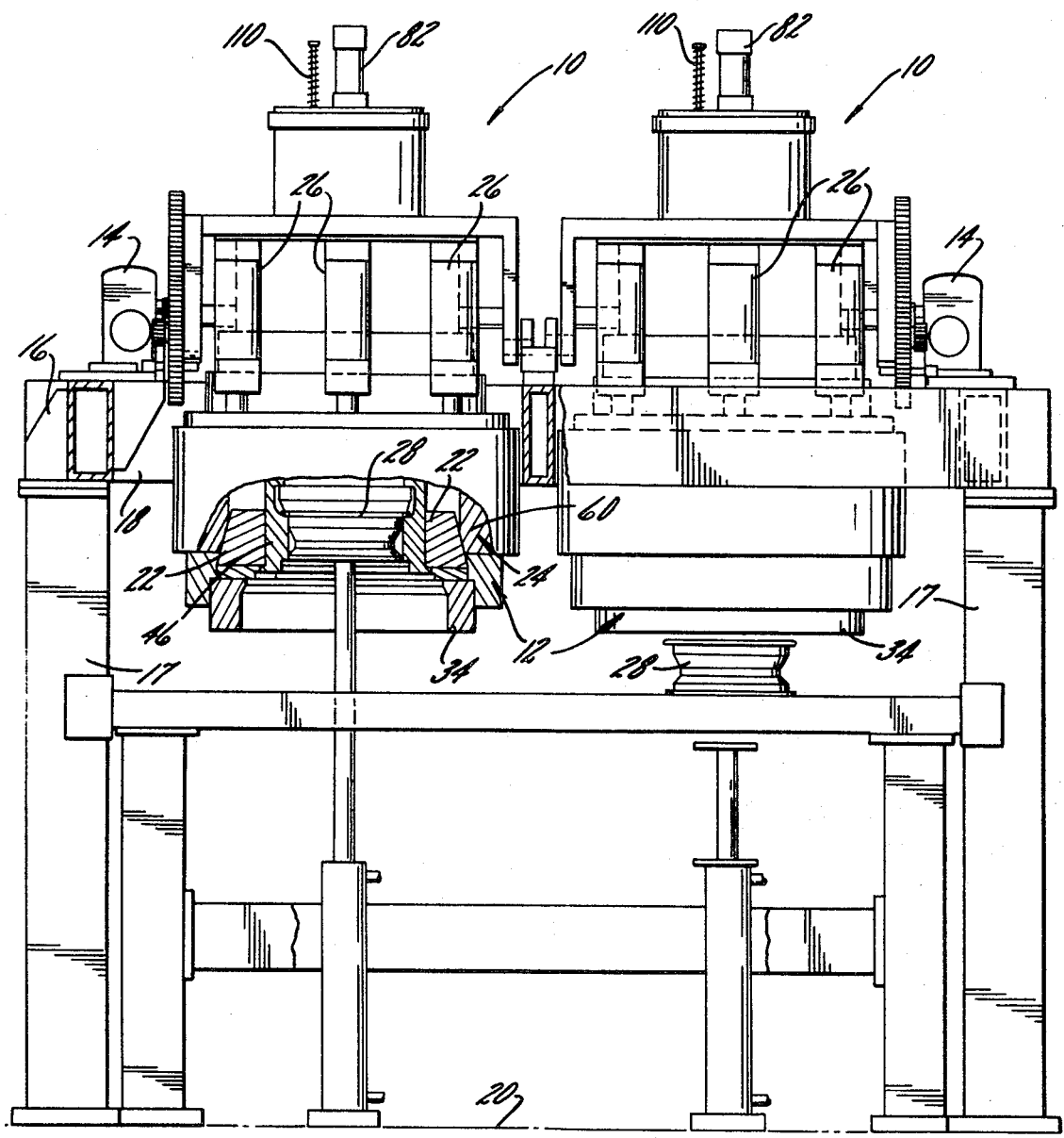
FIG. 1 is a side elevation of a shrink-forming apparatus constructed according to the present invention and having two separate heads.

With reference to the drawings, there is shown in FIG. 1, an exemplary compression or shrink forming apparatus, generally indicated at 10, embodying the present invention. The illustrated machine employs a pair of compression forming heads 12 mounted for rotation on trunions 14 which are supported by a frame 16. The frame 16 consists of uprights 17 and cross members 18 and is rigidly supported on a base or floor 20.

For details of the vertical support arrangement of the heads 12 arranged to rotate about a horizontal axis, reference is made to the aforementioned Stettler U.S. Pat. No. 3,564,898. While not so limited in its application this arrangement is particularly suited for use in connection with the compression forming of steel automobile wheels formed from several pressed component pieces.

It will be appreciated, however, that the head may be mounted independently in a frame illustrated in the aforementioned U.S. Pat. No. 3,461,710 to H.R. Luedi et al.

In general, the shrink forming head 12 comprises a cylindrical body opened at each end and within the body are a plurality of circumferentially spaced die jaw segments 22 arranged in a horizontal plane. The segments 22 are radially contractable by movement of a pressure ring 24 which contacts each of the die segments 22 in camming engagement to force them radially inward. At their inner limits of movement the segments 22 define a substantially continuous circumferential forming die. The power means for expanding and contracting the dies consists of hydraulic cylinders 26 disposed circumferentially about the body of the head 12 and serve to forceably move the pressure ring 24 in an axial direction for contraction of the die.

Workpieces such as automobile wheel 28 are fitted into the open jaws of the shrink forming head 12 whereupon the shrink forming operation is performed. Automatic transferring and loading of automobile wheels into the apparatus in seriatum order may be accomplished by means of mechanisms, indicated generally at 21, is described in the aforementioned U.S. Pat. No. 3,564,898 to Christian H. Stettler to which reference is made.

In the illustrative embodiment, auxiliary tooling 30 carried within the shrink forming head 12 performs a machining operation on the wheel workpiece 28 while it is retained within the die jaws 22. In the present instance, such tooling comprises a spindle driven reamer 32 (FIG. 3) for finish machining of the central hub opening of the wheel. This operation is desirably performed while the wheel is still retained in the forming die in order to assure maximum concentricity.

Figure 2:
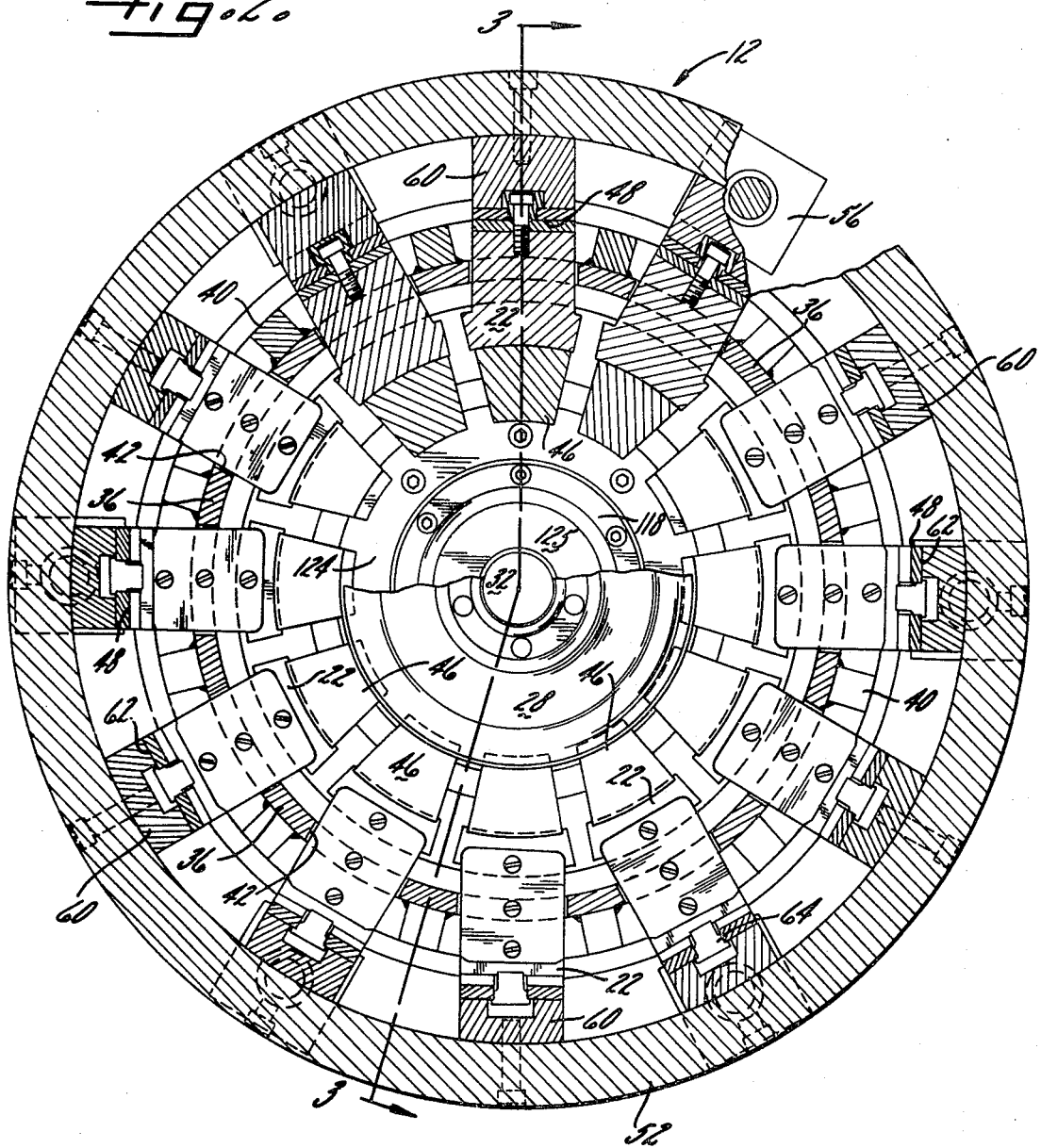
FIG. 2 is an enlarged fragmentary sectional view of a forming head taken perpendicular to the central axis of the machine in FIG. 1.
Figure 3:
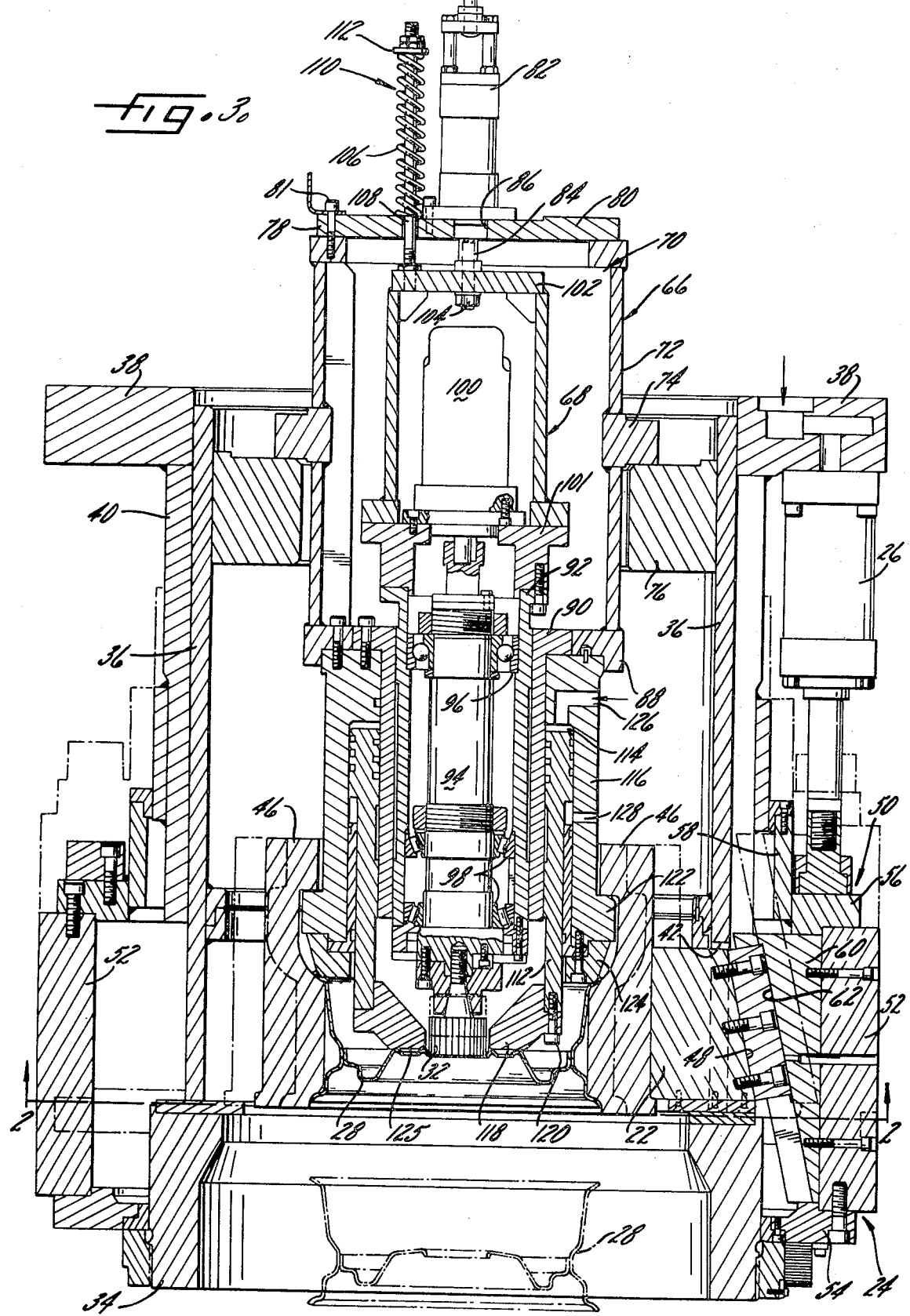
FIG. 3 is an enlarged broken sectional view taken along the line 3—3 in FIG. 2, illustrating the radial compression forming dies in the shrunk position and the axial forming means in an extended position; and depicting the shrink forming head dies and the axial forming means in their inoperative positions by phantom lines.

Referring to FIGS. 2 and 3, conjointly, the forming head components are concentrically disposed about the central opening or work station so that the head 12 is open ended to admit workpieces such as the wheel 28 through a mouth ring 34(FIG. 3). The head is made up of a cylindrical body 36 with is rear end being secured by welding or the like to a reaction ring 38. Reinforcing ribs 40 are welded about the periphery of the body 36 in a spaced array for stiffening the structure and for supporting the mouth ring 34 which is suitably secured by bolts or the like (not shown).

Disposed circumferentially about the mouth end of the body 36 are a plurality of spaced radial openings 42 arranged in the form of a segmented circular band. The openings 42 which are rectangular in shape are provided with suitable bearing surfaces. Within each opening 42 is a die segment 22, which rides against the bearing surface of the opening. The die segments have an inner surface to which is mounted a forming die member 46 directed radially inwardly of the body 36. At the opposite end of the die segment is an upper pressure face 48 defining a plane disposed at an acute angle to the central axis of the machine.

A pressure ring assembly 50 surrounds the body 36 and mouth ring 34 and is supported and guided at both ends for axial sliding movement on the machine body. The pressure ring assembly is built up for several rings, consisting of a main ring 52, a forward ring 54, an actuator mounting ring 56, and a rear guide ring 58, all fabricated into a unit by suitable fastening bolts and welds.

In order to move the die segments radially inward during the power stroke of fluid actuators 26 and for forward axial movement of the pressure ring assembly 50, a plurality of wedge blocks 60 are spaced about the inner surface of the main ring 52 as secured by bolts in positions corresponding to the openings 42 in the body 36. As shown by reference to FIG. 3 each wedge block 60 has an inner ramp surface 62 which defines an angled plane parallel to that of the corresponding pressure face 48 of its adjacent die segment 22. The actuator 26 are supplied with fluid under pressure through passages 63 and from a source (not shown).

In order to insure that the die segments 22 are constrained for sliding movement along the wedge block 60 in radial lines, each die segment 22 is slidably secured to its respective wedge block by means of a gib construction generally indicated at 64 (FIG. 2). For further details of the shrink forming head and the manner in which the die segments are actuated reference is made to the aforementioned Luedi et al. U.S. Pat. No. 3,461,710.

In accordance with one of the aspects of the present invention the forming head includes a centrally located auxiliary tooling assembly generally indicated at 66 which is insertable from the rear of the forming head.

The auxiliary tooling assembly is built up of a multi-component inner and outer relatively movable cylindrical bodies 68, 70, respectively. The outer body 70 includes a shell like casing 72 with array of peripheral outwardly extending blocks 74 secured intermediate its ends and held in position against an outer ring 76; the latter being secured to the head cylindrical body 36. The tooling outer body 70 at the rear has an end mounting ring 78 to which is attached an end plate 80 by bolts 81 or the like. The end plate carries a fluid operated servo 82 with its reciprocating piston rod 84 extending through an opening 86 in the plate 80.

At the forward end of the body 72 there is a cover ring 88 secured thereto and to a quill 90 projecting forwardly toward the mouth opening of the compression forming head.

The quill 90 telescopingly receives therein a inner quill 92 which carries a tool operating spindle rotatably journaled therein by bearings or the like 96, 98. The forward end of the spindle receives an operating tool such as reamer 32 to perform the machine operation on the workpiece 28. The spindle 24 is coupled to a source of rotating power such as motor 100, the latter being mounted to an end ring 101 which in turn is connected to the inner quill 92.

The rear end of the body 68 includes a cover plate 102 which receives the piston rod 84 having a threaded end and secured to the plate 102 with suitable fastener nut 104. The arrangement is such that the entire assembly 68 carrying the rotatable spindle and tool 32 is advanced axially toward the workpiece 28 held within the jaws 46 of shrink forming head when the servo 82 is actuated.

For the purpose of returning the assembly 68 in the rearward direction when energization of the servo 82 is discontinued, there is provided a resilient biasing drive 110 including a threaded shaft 108 connected to the plate 102 and extending outwardly through plate 80. A spring 110 disposed on the shaft is held between the plate 80 and retained by washer and nut arrangement 112 held on the outboard threaded end of the shaft. Thus, movement of the assembly 68 forwardly compresses the spring 106 and releases the forward driving force permitting the spring action to return the assembly 68 toward the rear of the head assembly.

In accordance with the present invention, provision is made for axially driven tooling disposed concentrically within the compression forming head to be moved longitudinally into contact with the workpiece to deform the latter by a predetermined amount while the workpiece is confined within the shrink forming jaws 46. To this end, there is provided an annular piston 112 concentrically disposed about the quill 90 and slidably received within a chamber 114 defined between an outer quill 116 and quill 90. The enlarged rear portion of the piston 112 is provided with sealing slots that receive rings or the like to effect a seal between the piston and respective quills 90, 116. The forward portion of the piston 112 receives a deforming die or head 118 bolted thereto by bolts 120. The deforming head 118 has a central opening through which the reamer 32 may pass.

The quill 116 is provided with upstanding flange 22 and attached to the forward face thereof is a annular collar 124. A corresponding annular groove is formed in the jaw dies 46 of the shrink forming head so that the jaws when closed radially inwardly grip the flange 122 stabilizing the auxiliary tooling assembly centrally within the compression forming head while collar 124 slidably engages the inner lip of the workpiece outer flange to press the same against the jaws 46. This latter action serves to press out any waviness that might be in the workpiece flange lip. By the same token, axial movement of the deforming head 118 engaging the inner web of the workpiece 28 to deform the same into perpendicularity permits the engaged portion to slid slightly with respect to the surface 125 of ring 118 to remove waviness that might be present in the inner web of workpiece 28.

In order to advance the piston 112 forwardly to effect the requisite deformation of the inner web of workpiece 28, fluid under pressure is introduced into the passageway 126 in quill 116 to fill the chamber 114 behind the piston. A pressure relief valve or the like (not shown) of the type well known to those skilled in the art is employed in the inlet line supplying fluid to the passage 125. With the setting of the relief valve arranged so that contact with the workpiece inner web is sensed by the build up of pressure and then relieved at the preset pressure an indication of the reference position of the axial tooling 118 upon contact is established.

At this point a fixed volume of fluid is delivered by means of a conventional displacement pump and valving (not shown) to move the tooling axially by the predetermined fixed amount that corrects the axial runout or perpendicularity of the inner web of workpiece 28. In the typical arrangement for correcting axial runout of automobile wheels the predetermined axial displacement is approximately 60 to 120 thousandths and such movement is sufficient to effect a permanent displacement on the inner web with no spring back when the piston 112 is retracted by the introduction of fluid pressure on the opposite side of the piston sealing portion through inlet 128.

We claim as our invention:

1. Apparatus for performing radial and axial forming operations on metal articles comprising, in combination,
   a shrink forming head having a plurality of radially contractable compression forming die jaws disposed in an annular array about an operating station,
   power means for contracting said die jaws about a workpiece for compression forming thereof,
   annular deforming tool means concentrically disposed within said forming head die jaws and shiftable in the axial direction, and
   power means for axially advancing the deforming tool means into contact with a portion of said article, and thereafter further axially advancing said tool means by a predetermined amount of axial movement after contact with the article held in the operating station by the contracted compression forming die jaws so that said portion of of said article contacted by said tool means is deformed by said predetermined amount of axial movement.

2. Apparatus as claimed in claim 1 wherein said power means for axially advancing the tool means comprises an annular fluid operated piston.

3. Apparatus as claimed in claim 2 wherein said piston is contained in a cylinder defined by inner and outer quill members, said outer quill member being engaged and held by the contracted die jaws of said compression forming head.

4. Apparatus as claimed in claim 3 including centrally disposed internal auxiliary tooling means having a tool operator adapted to receive a cutting tool thereon, said auxiliary tooling means being disposed within said inner quill and axially shiftable with respect thereto, and said axially shiftable tool means having an opening therein to permit a tool carried by said auxiliary tool operator to pass therethrough and perform a machining operation on said workpiece.

5. Apparatus for radially and axially forming metal articles comprising, in combination,
   a shrink forming head having a plurality of radially contractable compression forming die jaws disposed in an annular array about an operating station,
   power means for contracting said die jaws about a workpiece for compression forming thereof,
   annular deforming tool means concentrically disposed within said forming head die jaws and shiftable in the axial direction,
   power means for axially advancing the tool means for deforming said article in the axial direction while held in said contracted die jaws,
   means associated with said power means for sensing a reference position upon contact by the deforming tool means with the workpiece and means for actuating said power means for axially advancing the tool means a predetermined fixed amount from said contact reference position.

* * * * *